Oct. 24, 1950
P. E. CHANEY
2,526,857
METHOD FOR LOGGING WELLS
Filed June 10, 1949
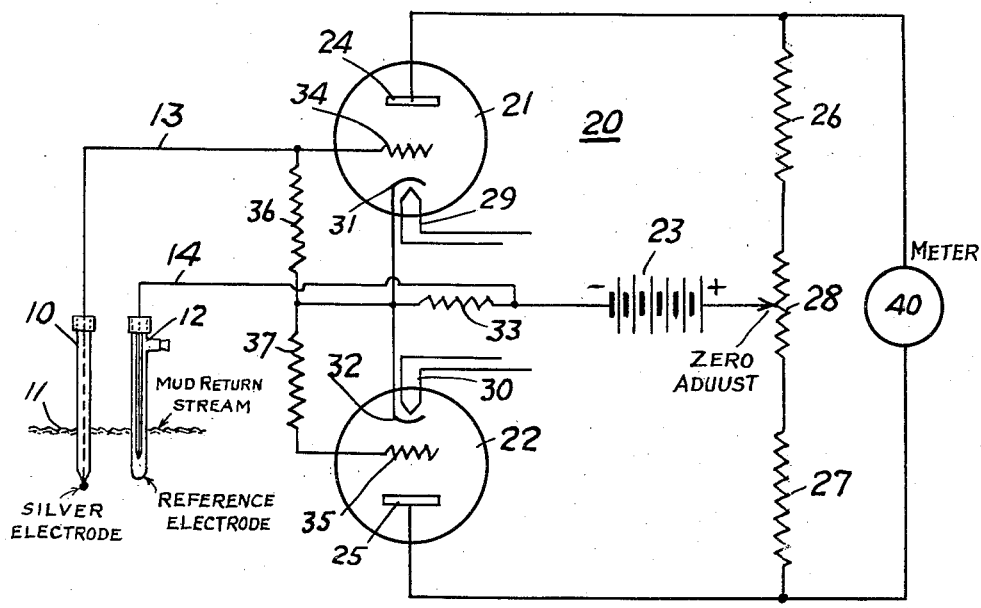
WITNESS:
Rob R Kitchel
INVENTOR
Preston E. Chaney
BY
Busser and Harding
ATTORNEYS.

Patented Oct. 24, 1950

2,526,857

UNITED STATES PATENT OFFICE 2,526,857

METHOD FOR LOGGING WELLS

Preston E. Chaney, Beaumont, Tex., assignor to Sun Oil Company, Philadelphia, Pa., a corporation of New Jersey Application June 10, 1949, Serial No. 98,300

3 Claims. (Cl. 204—1)

The present invention relates to a method for logging subterranean formations penetrated in well drilling operations.

In the course of rotary drilling for oil it is customary to circulate a drilling fluid such as drilling mud down the drill pipe where it passes through the fluid passages of the bit and into the annulus between the drill pipe and the bore hole to return to the surface. The cuttings produced by the rotary action of the bit together with any fluids encountered in the drilled earth formation are carried upwardly in the returning mud fluid to the surface. Thus any gas or salt water encountered in the drilled formation will be conveyed to the surface by the returning mud stream. It has become common practice to log the formations penetrated by the drill bit by analyzing the returning mud fluid to detect the presence of gas or salt water encountered in the drilled formation. Suitable equipment for detection of this gas or salt water contained in the drilling mud is provided at the mud discharge and such equipment may take the form of a conductivity bridge such as that disclosed by the U. S. patent to Hackstaff and McCutcheon, No. 1,720,325, July 9, 1929.

To the best of my knowledge such equipment for analyzing the salt water content of the returning mud fluid depends in its operation upon changes in conductivity of the mud stream due to the presence of dissolved salts. Now, as is well known, the rate of increase in conductivity of aqueous solutions decreases rapidly with increasing concentration of dissolved electrolytes or salts and therefore the change in conductivity of a mud fluid as produced by, for example, 100 parts per million of salt to a solution already containing 5000 parts per million of dissolved electrolytes would be far less than the change in conductivity produced by the addition of 100 parts per million of salt to distilled water. Since it is now customary to control the viscosity of the drilling mud fluid by adding to it quantities of various phosphates in such amounts that the concentration of dissolved phosphates in the mud may well be in the order of 5000 parts per million, it is apparent that the conductivity method of indicating the presence of salt water in a drilling mud is not sensitive enough for practicable purposes when the drilling mud contains such viscosity controlling ingredients.

It is therefore an important object of my invention to provide a method for determining, as the drilling progresses, changes in the chloride ion concentration of drilling muds containing added phosphates. From this information the subterranean formations penetrated may be logged.

It has now been discovered that the potential of a silver electrode immersed in circulating drilling fluid, as compared to the potential of a standard electrode, varies in accordance with changes of concentration of the chloride ion content of the drilling mud, and that this change is substantially independent of the concentration, or of changes in concentration, of the various phosphate ions which may be present in the drilling mud.

Thus, by observing or recording changes in the potential of the silver electrode, the changes in the chloride ion content of the drilling fluid are determined. The fact that the various phosphate ions do not interfere with the present measurement is especially surprising in view of the fact that both the chloride and phosphate ions form insoluble silver salts, the insolubility of such salts being of the same order of magnitude.

Sodium acid pyrophosphate has found wide acceptance as a drilling mud additive, and the present process of determining changes in chloride ion concentration in the presence of this phosphate forms a preferred embodiment of the present invention. Other phosphates which may be employed include, for example, sodium tetra phosphate, tetra sodium pyrophosphate, and sodium hexa meta phosphate. Usually such phosphates are employed in concentrations of from about 500 to 15,000, and preferably from 1000 to 5000, parts per million.

In performing the process of the present invention, it is important that the pH of the drilling mud fluid be maintained between 7 and 9.5. At a pH of below 7 corrosion difficulties are encountered, and at a pH of above 9.5 the present process is practically inoperative, probably due to poisoning of the surface of the silver electrode.

Referring to the drawing, a typical application of my invention is shown for indicating changes in the concentration of salt water by indicating changes in concentration of the chloride ion in a returning drilling mud fluid. A silver electrode 10 is immersed in the returning mud stream 11. A reference electrode 12 which may be a calomel reference electrode of the well known type is also provided. The potential of each electrode will be present at terminals 13 and 14 respectively, and if a potential difference exists between the two electrodes, an electromotive force will exist in a circuit connecting the two electrodes. By selecting a suitable reference electrode 12, the potential difference at terminals 13 and 14 will be such as to provide a practicable operating voltage for the general range of chloride ion concentration to be encountered in the drilling mud fluid. The potential difference or voltage at terminals 13 and 14 may be measured in any suitable manner and a change in the voltage has been found to be indicative of a change in the chloride ion concentration in the drilling mud.

The potential difference between the silver electrode 10 and the reference electrode 12 may be measured in any suitable manner but I have disclosed, in connection with the drawing, a balanced direct-current amplifier indicated generally at 20. The amplifier 20 is comprised of a pair of triodes 21 and 22 having a common source of plate voltage which may be the battery 23 shown. The plates 24 and 25 of the triodes 21 and 22 are connected to the positive terminal of the battery 23 through suitable plate impedances 26 and 27 and potentiometer 28. The potentiometer 28 may be adjusted to establish equal plate voltages for the triode plates 24 and 25 under a given relation of grids to cathode potential for each tube. Tube filaments 29 and 30 are connected to any suitable source of filament current (not shown) while the cathodes 31 and 32 are connected together and through the common cathode resistor 33 to the negative terminal of the battery 23. The control grids 34 and 35 are connected through fixed grid resistors 36 and 37 to the common cathode connection as shown, thereby establishing a grid bias. The reference electrode 12 is connected to the negative terminal of the battery 23 while the silver electrode 10 is connected to the control grid 34 of triode 21. Thus the relation of grid cathode voltages of triode 21 differs from triode 22 by the applied voltage which is the potential difference between the reference electrode 12 and the silver electrode 10. A meter 40 may be connected between plates 24 and 25 and a difference in plate voltage due to the different plate currents in the tubes will be indicated. By adjusting the potentiometer 28 the plate voltage at the plates 24 and 25 may be made equal for a given relation of grid voltages on grids 34 and 35. Thereafter, should the grid voltage on grid 34 change in accordance with a change in potential difference between the silver electrode and the reference electrode, the plate voltages at tube plates 24 and 25 will be different from each other due to a change in plate current flowing in tube 21 and therefore an indication will be made by the meter 40. This indication will be proportional to a change in chloride ion concentration.

The following example illustrates a preferred embodiment of the present invention, which is not to be considered as limited thereby:

A drilling mud fluid was prepared from a commercial clay (Green Band) and distilled water. The chloride ion concentration was gradually increased by adding sodium chloride, and the change of potential of a silver electrode immersed therein was determined by reference to a calomel electrode. The apparatus used was in accordance with the drawing, described above. The process was repeated using the same drilling mud fluid to which was added 15,000 parts per million of sodium acid pyrophosphate. This high concentration of phosphate is above the quantity usually employed, and was selected for use in the present example to demonstrate the efficacy of the present process. In each instance the pH was within the operable range of 7 to 9.5. Data obtained are as follows:

| Chloride Ion Concentration (P. P. M.)[1] | Deflection (Millivolts×10) | |
|---|---|---|
| | No $Na_2H_2P_2O_7$ | 15,000 P. P. M.[1] $Na_2H_2P_2O_7$ |
| 0 | 0 | 0 |
| 250 | 36 | 34 |
| 500 | 59 | 52 |
| 1,000 | 86 | 76 |
| 2,000 | 116 | 101 |
| 3,000 | 132 | 117 |
| 4,000 | 143 | 128 |
| 5,000 | 152 | 136 |

[1] Parts per million.

Of course, with lower concentrations of phosphate, the difference in readings becomes less, so that at a concentration of about 5,000 P. P. M. of sodium acid pyrophosphate there is no practical difference in readings obtained in the presence and absence of the phosphate, even at very high chloride ion concentrations, i. e., changes in chloride ion concentration, independent of the concentration of phosphates, and of changes in the concentration of phosphates, are observed.

When other phosphates are employed instead of sodium acid pyrophosphate, substantially identical results are obtained within the pH range of from 7 to 9.5.

This application is a continuation-in-part of my co-pending patent application Serial No. 593,163, filed May 11, 1945, (now abandoned).

I claim:

1. In the logging of subterranean formations penetrated in well drilling operations by analyzing effluent drilling mud fluid for salt content, the method of continuously determining changes in the concentration in said drilling mud fluid of chloride ions, which comprises continuously circulating drilling mud fluid containing added phosphates, and having a pH of from 7 to 9.5, into and out of said well during the drilling operation, contacting the effluent drilling mud fluid with an electrode of reference potential and a silver electrode, and measuring the potential difference between said electrodes.

2. The method according to claim 1 wherein the added phosphate is sodium acid pyrophosphate.

3. The method according to claim 2 wherein the concentration of sodium acid pyrophosphate is from 500 to 15,000 parts per million.

PRESTON E. CHANEY.

REFERENCES CITED

The following references are of record in the file of this patent:

"Journal of the Society of Chemical Industry," vol. 67 (January 1948), pages 1 and 2.

"Transactions of the Faraday Society," vol. 38, part 9 (Sept. 1942), pages 389, 390, 391.

"Chemical Abstracts," vol 39 (1945), page 2193.

"U. S. Bureau of Mines Report RI 3556" (Feb. 1941), page 47.